United States Patent [19]

Hoff et al.

[11] 4,130,699

[45] Dec. 19, 1978

[54] VAPOR PHASE POLYMERIZATION WITH TEMPORARILY INACTIVE TITANIUM CATALYST

[75] Inventors: Glen R. Hoff; John L. Melquist, both of Naperville, Ill.; Peter Fotis, Highland, Ind.

[73] Assignee: Standard Oil Company (Indiana), Chicago, Ill.

[21] Appl. No.: 854,831

[22] Filed: Nov. 25, 1977

[51] Int. Cl.² ............................ C08F 2/34; C08F 10/00
[52] U.S. Cl. ................................ 526/67; 526/69; 526/70; 526/82; 526/84; 526/85; 526/86; 526/88; 526/124; 526/125; 526/159; 526/901
[58] Field of Search ............... 526/67, 69, 70, 82, 526/84, 85, 86, 88, 124, 125, 159, 901

[56] References Cited

U.S. PATENT DOCUMENTS

| | | | |
|---|---|---|---|
| 3,002,963 | 10/1961 | Czenkusch et al. | 526/901 |
| 3,023,203 | 2/1962 | Dye | 526/901 |
| 3,644,318 | 2/1972 | Diedrich et al. | 526/901 |
| 3,652,527 | 3/1972 | Trieschmann et al. | 526/159 |
| 3,676,415 | 7/1972 | Diedrich et al. | 526/901 |
| 3,694,421 | 9/1972 | Vetter | 526/901 |
| 3,708,465 | 1/1973 | Dietrich et al. | 526/84 |
| 3,957,448 | 5/1976 | Shepard et al. | 526/67 |
| 3,965,083 | 6/1976 | Jezl et al. | 526/67 |
| 3,971,768 | 7/1976 | Peters et al. | 526/68 |
| 4,035,560 | 7/1977 | Caumartin et al. | 526/86 |

FOREIGN PATENT DOCUMENTS

| | | | |
|---|---|---|---|
| 216770 | 10/1956 | Australia | 526/86 |
| 292997 | 4/1971 | U.S.S.R. | 526/67 |

*Primary Examiner*—Alan Holler
*Attorney, Agent, or Firm*—William H. Magidson; Arthur G. Gilkes; William T. McClain

[57] ABSTRACT

Vapor phase polymerization of an olefin which comprises conveying inactive high yield titanium catalyst component to a vapor phase polymerization reactor with a liquid comprising recycled quench liquid, reactivating said inactive high yield titanium catalyst component inside the reactor with a metal alkyl reducing agent and polymerizing olefin under gas phase polymerization conditions with reactivated high yield catalyst to form a resinous polymer of an olefin having a low level of catalyst residues.

22 Claims, 1 Drawing Figure

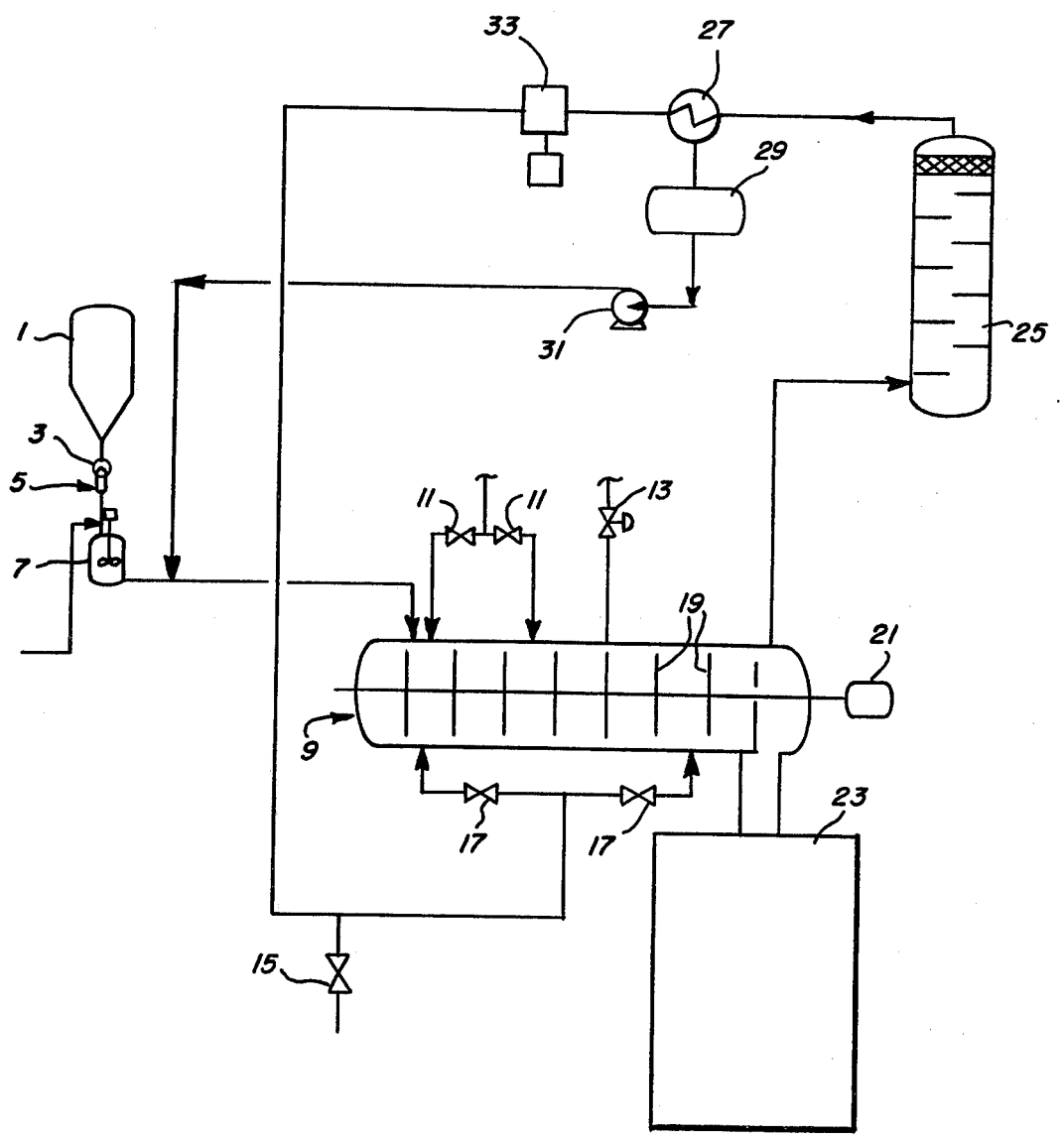

VAPOR PHASE POLYMERIZATION WITH TEMPORARILY INACTIVE TITANIUM CATALYST

This invention relates to vapor polymerization utilizing a temporarily inactive high yield catalyst component and activation of said catalyst component in the vapor phase reactor.

During the last few years there has been considerable interest in vapor phase polymerization of olefins, particularly ethylene and propylene. However, the production of commercial quality resin is complicated by economic, process and catalyst requirements. It is generally recognized that vapor phase polymerization is not economically practical unless the polymerizate can be sold containing catalyst residues. If the catalyst residues must be removed, there is no economic incentive for the vapor phase process. Although a wide variety of catalysts can be used for vapor phase polymerization of olefins, the products have poor color and limited commercial marketability unless a high yield catalyst system is employed. By using a high yield catalyst system, the catalyst residues in the polyolefin can be maintained at a sufficiently low level that the catalyst residues do not impart aesthetically unacceptable color.

High yield catalyst systems present other problems. For example, the more active catalyst system, the harder it is to add controlled low concentrations of catalyst component to the polymerization system. If the catalyst concentration is not carefully controlled, large lumps tend to form in the reactor forcing premature shut down of continuous reactors, since the lumps cannot be handled efficaciously in the take off zone of the reactor. Lumps can be prevented by diluting the catalyst component with a suitable organic liquid and adding a dilute solution of catalyst component to reactor. The more active the catalyst the greater the dilution required.

Although commonly assigned U.S. Pat. Nos. 3,957,448 to Shepard et al., 3,965,083 to Jezl et al. and 3,971,768 to Peters et al. disclose using recycled quench liquid to convey catalyst component into a vapor stage polymerization reactor, the high reactivity of high yield catalyst systems present an additional problem since the quench liquid contains olefin. The economically practical high yield catalyst components are so reactive that they tend to polymerize the olefin in the quench liquor plugging the catalyst addition lines to the reactor unless extreme care is taken. Plugging can be prevented by removing all olefin from the recycled quench liquid which is not economically practical. Alternatively, the quench liquid can be cooled to below 0° C. before contact with the catalyst component thereby reducing the catalyst activity because of the lower temperature. This is also economically unattractive. Further, this problem cannot be overcome by using fresh quench liquid to convey the catalyst to the reactor since this alternative will not provide sufficient dilution of the high yield catalyst component without overloading the system with liquid and subsequently dumping quench liquid. Accordingly, there is need for a practical system of conveying high yield catalyst component to a continuous vapor phase polymerization system.

The general object of this invention is to provide a commercially practical process of vapor phase polymerization of olefins. Other objects appear hereinafter.

For purposes of this invention the term "high yield titanium catalyst component" refers to titanium catalyst components including support capable of yielding at least 5,000 grams, preferably at least 10,000 grams, polyolefin per gram of titanium catalyst component when used in conjunction with a metal alkyl reducing agent. The term "high yield titanium catalyst" refers to the combination of titanium catalyst component and metal alkyl reducing agent.

We have now found that the objects of this invention can be attained by conveying inactive high yield titanium catalyst component to a vapor phase olefin polymerization reactor with a liquid comprising recycled quench liquid, reactivating said inactive high yield titanium catalyst component inside the reactor with a metal alkyl reducing agent and polymerizing olefin under gas phase polymerization conditions with reactivated high yield catalyst to form polyolefin having a low level of catalyst residues. The high yield titanium catalyst component can be deactivated to a temporary inactive state with alcohols, ethers, ketones, aldehydes, carboxylic acids, carboxylic acid esters, carboxylic acyl halides, hydrogen halides, water, etc., some of which are disclosed in Dietrich et al. U.S. Pat. No. 3,708,465, Belgium Pat. No. 848,223, Coover et al. *Journal of Polymer Science:* Part A-1, Vol. 4, Pages 2583–2596 (1966), High Polymer, Volume XX, Page 371, Interscience Pub. (1965), etc., which are incorporated herein by reference, and reactivated to a high yield catalyst after addition to the vapor phase reactor with metal alkyl reducing agent. In this way, it is possible to form a high yield catalyst inside the vapor phase reactor without plugging catalyst addition lines from polymerization of olefin in the quench liquor, without the formation of large lumps in the vapor phase reactor and without discarding contaminated quench liquid.

The high yield titanium catalyst components generally comprise the reaction product of a tetravalent titanium compound and an aluminum alkyl and preferably a support.

The tetravalent titanium compound can comprise a lower alkyl titanium (IV) alkoxide, lower alkyl titanium (IV) alkoxy halide (preferably the chloride) or lower alkyl titanium (IV) halide (preferably the chloride) wherein the alkoxy groups contain 1 to 6 carbon atoms (methoxy, ethoxy, butoxy, hexoxy, etc.).

The aluminum alkyl can be any lower alkyl, alkylaluminum compound, such as a trialkyl aluminum, dialkyl aluminum halide (preferably chloride), alkylaluminum dihalide (preferably the dichloride) wherein the alkyl groups contain 1 to 6 carbon atoms (methyl, ethyl, isopropyl, butyl, hexyl, etc.).

The support can be a magnesium compound, chromium oxide, alumina, silica, alumina-silica, etc. Because of the high activity of the resulting catalyst, the preferred supports are magnesium compounds, such as magnesium alkoxides containing 1 to 6 carbon atoms in the alkoxide, magnesium oxide, magnesium salts, such as halides (chlorides), acylates (acetates), etc.

If desired additional transition metal compounds can be employed with the tetravalent titanium compound, aluminum alkyl, etc., such as vanadium (III), (IV) or (V) alkoxides, alkoxyhalides (preferably chlorides), halides (preferably chlorides), zirconium (IV) alkoxides or alkoxyhalides (preferably chlorides), halides (preferably chlorides) etc. wherein the alkoxy or alkoxide groups contain from 1 to 6 carbon atoms.

As indicated above, inactivating agents include alcohols, phenols, ethers, ketones, aldehydes, carboxylic acids, water, hydrogen halides, mercaptans, disulfides, oxygen, etc. Specific examples of deactivators include any of those described in Dietrich U.S. Pat. No. 3,708,465.

Suitable organic compounds are aliphatic, cycloaliphatic and aromatic alcohols, having 1 to 8 carbon atoms, preferably with boiling points below 200° C. and phenols having 6 to 16 carbon atoms, for example methanol, ethanol, n-propanol, isopropanol, the primary, secondary and tertiary butanols, pentanols, hexanols, heptanols and octanols, cyclohexanol and the isomeric alkylcyclohexanols, benzyl alcohol, phenol as well as o-, m-or p-cresol. Aliphatic alcohols, preferably lower aliphatic alcohols, such as methanol, ethanol, n-propanol or isopropanol and the butanols, are particularly advantageous.

Ethers having 2 to 10 carbon atoms are suitable, such as dimethyl ether, diethyl ether, dipropyl ether, dibutyl ether, tetrahydrofuran, tetrahydropyran and mixed ethers, and also acetals or diacetals.

Ketones having 3 to 10 carbon atoms are suitable, such as acetone, methyl ethyl ketone, diethyl ketone, methyl propyl ketone, the isomeric pentanones, hexanones, heptanones and octanones, 2,4-pentadione as well as cyclic ketones, such as cyclohexanone and the like.

Other organic compounds are aldehydes, having 1 to 10 carbon atoms, such as formaldehyde, acetaldehyde, propionaldehyde and their homologues, cycloaliphatic aldehydes, aromatic aldehydes, such as benzaldehyde and their homologues; carboxylic acids such as formic acid, acetic acid, propionic acid or butyric acid; carboxylic acid esters such as methyl acetate, ethyl acetate, etc.; acyl halides such as acetyl chloride, propionyl halide, etc.

It is also possible to use the hydrogen halides, above all hydrogen chloride and also hydrogen bromide, as well as water, hydrogen sulfide, etc.

Suitable sulfur containing deactivators include mercaptans, such as methyl mercaptan, butyl mercaptan, etc.; alkyl and aryl sulfides such as dioctyl sulfide, di-(2-ethylhexyl) disulfide, diphenyl sulfide, etc.; sulfenyl halides; xanthates; alkyl and aryl thionothioic acids, etc.

Of course, it is also possible to employ a mixture of several of the deactivators mentioned, it being necessary to ensure that their total molar percentage amount, relative to the alkyl groups or hydride groups, bonded to metal (transition metal and/or aluminum), which are present in the reaction mixture, lies within the appropriate maximum amount and minimum amount. For example, it is possible to employ an alcohol containing water; in this case it is, however, advisable that the amount of water should not be chosen too high.

The deactivating agents can be used in a concentration of about 10 to 1000 mole percent, preferably 50 to 150 mole percent, based on the alkyl groups and/or hydride groups bonded to metal (transition metal and aluminum) present in the titanium catalyst component.

Of these inactivating agents alcohols are preferred since polyethylene cast film has a higher toughness and tear strength in the machine direction than polymers produced with other high yield titanium catalyst components. The hydrogen halides are somewhat less preferred but have the advantage that other things being equal they are capable of producing polymers having a larger particle size. Unfortunately, the polymers produced using a hydrogen halide inactivating agent have somewhat poorer color than polymers produced using alcohols.

Since many of the high yield titanium catalyst components are commercially available, we believe it is desirable to describe the preparation of the preferred magnesium supported high yield titanium catalyst components. These high yield magnesium supported catalysts can be prepared by either of two routes. For example, the magnesium compound and the transition-metal-containing material (titanium compound alone or together with vanadium or zirconium compound) can be reacted in the presence of an inert diluent and thereafter reacted with the alkyl-aluminum compound. Alternatively, the magnesium compound, transition-metal-containing material and alkyl-aluminum compound can be reacted together preferably in the presence of an inert diluent.

The relative amounts of magnesium compound and transition metal compound used to make up the solid catalyst component are preferably about 1/10 to 10 mols of the transition-metal-containing material per mol of magnesium compound used, and, more preferably, about ¼ to 2 mols of transition-metal-containing material per mol of magnesium compound used. The relative amount of the alkyl-aluminum compound preferably used in the catalyst component preparation is about two-tenths to ten mols of alkyl-aluminum compound per total mols of magnesium and transition-metal-containing material. More preferably, this ratio varies between about ½ to 5 mols of alkyl-aluminum compound per total mols of magnesium and transition metal containing material employed.

Preferably, each reaction step involved in making the solid titanium catalyst component is carried out by heating in the temperature range from about ambient to about 150° C. Generally, reactions involving an alkyl-aluminum compound are carried out at the lower end of the above ranges whereas reactions involving the support and the transition metal are carried out at the upper end of the above ranges.

It is generally efficacious and preferred to carry out each preparative step in an inert, liquid diluent. However, where the transition-metal-containing material is reacted in a separate step, such materials if stable and liquid can be used neat. By inert liquid diluent is meant a diluent which at least partially dissolves some of the reactants and is substantially unreactive with the reactants and the product at the reaction temperature. Hydrocarbons, aromatic or aliphatic, such as benzene or heptane and their halo derivatives are excellent for this purpose if they can be conveniently handled at the reaction temperature. Aliphatic hydrocarbons such as a hexane, an octane or a decane are preferred. It is important, for best results, that the inert liquid diluent chosen is purified prior to use from traces of moisture, oxygen, etc. and traces of polar organic substances, etc. by, for example, percolating the diluent through silica gel or molecular sieves.

Preferably, each preparation step is allowed to continue about 30 minutes to about 48 hours and, more preferably, about 2 hours to about 24 hours.

Irrespective of the source of high yield titanium catalyst components, the high yield titanium catalyst component is then deactivated to the temporarily unreactive state with alcohols, ethers, ketones, aldehydes, carboxylic acids, hydrogen halides, water, mercaptans, disulfides, oxygen, etc. so that the olefin polymerization ability of the catalyst at 25° C. is reduced by at least 75%, preferably at least 90%. The inactive high yield catalyst can then be restored to at least 60%, preferably at least 75% of its polymerization capability at 80° C. by treatment with a metal alkyl reducing agent, preferably aluminum alkyl compound. As indicated above, the amount of deactivating reagent sufficient to prepare the temporarily inactive high yield titanium catalyst components depends upon the amount of alkyl metal compound used to prepare such component and is preferably in the range of between ½ to 1½ mols for each mol of alkyl-aluminum and/or alkyl transition metal compound in the catalyst component. The concentration of alkylaluminum compound can be determined by routine analysis for aluminum.

Inactivating agent, preferably diluted with inert diluent, is generally added to the catalyst component after the catalyst component is suspended in an inert liquid diluent (after assuring that the agent and diluent are dry). The excess liquid diluent is then decanted. Drying is not necessary where water is the inactivating agent. The inactivation temperature is preferably in the range of ambient (minus 10° C.) to about 100° C. and more preferably in the range from about ambient to about 70° C.

Subsequently, the inactive high yield titanium catalyst component is activated in the reactor with a metal alkyl reducing agent (promoter) which is preferably an alkyl-aluminum compound. More preferably, it is a lower alkyl, trialkylaluminum, a dialkylaluminum hydride or a dialkylaluminum halide (chloride) and, more preferably, a lower alkyl, trialkylaluminum is the promoter used. By lower alkyl is meant an alkyl group containing between one and about six carbon atoms.

Whereas the preferred olefin is ethylene, the process of this invention can be used in the polymerization of other $C_3$ to $C_8$ terminal olefins as well. Such $C_3$ to $C_8$ terminal olefins are, e.g., propene, 1-butene, 1-pentene, 4-methylpentene-1, styrene, etc. or a polymerizable diolefin such as butadiene, isoprene, etc. Obviously, the treated solid catalyst components can be used also for the polymerization of mixtures of such olefins.

It is of particular importance, for best results, that the olefin, for example ethylene, be substantially free of catalyst poisons. Thus, it is preferred to use polymerization grade ethylene and to pass it through a molecular sieve prior to use to remove the remaining traces of moisture, oxygen, carbon dioxide and polar organic compounds.

The polymerization quench liquid can be an aliphatic alkane or cycloalkane such as, butane, isobutane, isopentane, pentane, hexane, heptane or cyclohexane, etc. When higher olefins containing 3 to 8 carbon atoms are the principal polymerizable monomer, the olefin can be used as the quench liquid.

The process of this invention is normally used with an additive to control molecular weight such as hydrogen. Solid polymers having average molecular weights greater than about 50,000 and less than about 2,000,000 result thereby. The amount of hydrogen to be used depends upon the molecular weight distribution to be obtained and is well known to those skilled in the art.

The polyolefins prepared in accordance with this invention can be extruded, mechanically melted, cast or molded as desired. They can be used to form plates, sheets, films or a variety of molded objects.

In somewhat greater detail the process of this invention is described with reference to the drawing. The inactive high yield titanium catalyst component in catalyst vessel 1 is metered from metering pump 3 and combined in addition port 5 with fresh quench liquid, preferably saturated alkane, and passed to mixing vessel 7. Provision is also provided for further dilution of catalyst with additional quench liquor in a line connecting catalyst vessel 1 and mixing vessel 7. Partially diluted inactive titanium catalyst component is metered from mixing vessel 7, further diluted with recycled quench liquid containing olefin emanating from liquid pump 31 and conveyed to vapor phase reactor 9. The inactive high yield titanium catalyst component is sprayed onto the polymer bed in the vapor phase reactor 9 while alkyl metal reducing agent (preferably aluminum alkyl reducing agent) is added to the vapor phase reactor from addition ports 11 thereby reactivating the high yield titanium catalyst component. Simultaneously make up olefin, preferably ethylene, is added from addition port 13, hydrogen make up leaves addition port 15 and enters into the reactor at ports 17. Impellers or paddles 19 are continuously rotated by motor 21 and polyolefin is taken off into receptacle 23. Vaporized quench liquor leaves the vapor phase reactor and goes to scrubber 25 where a substantial portion of fines (small particle size polymer) and metal alkyls are collected. Scrubber off gas containing unreacted olefin, hydrogen, alkane and small quantities of metal alkyl go to heat exchanger 27 where the remainder of the metal alkyl is removed and quench liquid containing olefin is collected in condensate receiver 29. The gases are collected in heat exchanger 27, primarily olefin and hydrogen, exit to the recycle compressor 33 and are recycled to the reactor. If desired, additional olefin can be added to this line prior to or after compressor 33. The collected quench liquor passes from liquid pump 31 to the catalyst addition line connecting catalyst mixing vessel 7 and reactor 9. In view of the closed loop nature of this process, there is substantially little loss of quench liquor and no need to flush excess quench liquor.

If desired the process of this invention can be utilized in the process described in the aforesaid Peters et al. U.S. Pat. No. 3,971,768, which is incorporated by reference to prevent the line plugging referred to at column 6, lines 12 to 24. In this mode of operation the inactive high yield titanium catalyst component can be metered into the reactor by first diluting the catalyst component with fresh quench liquor and then further diluted with recycled quench liquid.

In those cases where propylene or higher olefins are employed as a principal polymerizable monomer, it is generally preferred that inert fresh alkane hydrocarbon be used to convey the concentrated catalyst from catalyst vessel 1 to mixing vessel 7. However, the higher olefin can be added to the partially diluted catalyst component in the line connecting addition port 5 and mixing vessel 7.

The overall reactor temperature range for polymerization depends upon the particular monomer which is being polymerized and the commercial product desired therefrom and as such as well known to those skilled in this art. In general, the temperature range used varies between about 40° C. up to the softening temperature of the polymer in the bed. The total polymerization pressure is composed of the polymerizable monomer pressure, vaporized quench liquid pressure and hydrogen pressure, if used, and such total pressure typically varies from above about atmospheric to about 1,000 psi, preferably 100 p.s.i.g. to 600 p.s.i.g. The individual partial pressures of the components making up the total pressure determine the rate at which polymerization occurs, the molecular weight, and the molecular weight distribution of the polymer to be produced.

The process described herein can be applied to the polymerization of polymerizable monomer which are polymerizable below the softening points of their polymeric forms including ethene, propene, 4-methylpentene-1, butene-1, vinyl chloride, butadienes, styrene, poly(ethyleneterephthalate) and mixtures of such monomers. Particularly suitable are the polymerization of ethene and propene.

The quench liquid used for temperature control and conveying inactive catalyst to the reactor is a readily volatilizable quench liquid which is sprayed onto the surface of the polymer bed to evaporatively conduct heat away from the polymer bed and thus must be inert to the monomer being polymerized, the catalyst components used in the polymerization, and have as high a heat of evaporation as is consistent with the desired level of volatilizability of the quench liquid in the reactor at the polymerization temperature. In general alkanes such as propane, a butane, a pentane, or a hexane or closely boiling mixtures thereof may be used. The preferred quench liquid for ethylene is isobutane or isopentane. It should be understood that where the monomer to be polymerized is readily condensible, e.g. propylene, the quench liquid can be liquefied monomer or a mixture of liquefied monomer and an additional quench liquid.

The rate of quench liquid addition should be sufficiently low so that the polymer bed remains dry, i.e. maintain the partial pressure of the quench liquod vapor below the dew point, yet large enough to obtain the maximum cooling effect of the quench liquid. Generally, the quench liquid will carry away fifty percent or more of the heat of polymerization. For propene polymerization over ninety percent of the heat of polymerization is desirably removed by the quench liquid. At a 200° F. polymerization temperature in the polymerization of ethene, desirably more than 70 percent of the heat of polymerization is removed using isobutane and more than 50 percent of the heat is removed using isopentane.

The quench liquid used to convey the inactive high yield titanium catalyst component can comprise from about 25 to 95 parts by weight recycled quench liquid and correspondingly 75 to 5 parts by weight virgin quench liquid. Preferably the concentration is from about 50 to 90 parts by weight recycled quench liquid and 50 to 10 parts by weight virgin quench liquid. While the actual concentrations used depend on the degree of deactivation of the titanium catalyst component, the activity of the deactivated titanium catalyst component, the deactivator used and amount of quench liquid lost from the process, it is anticipated that in commercial operation about 75 to 90 parts by weight recycled quench liquid will be employed.

EXAMPLE I

This example illustrates the production of an ethanol inactivated titanium catalyst component and the use thereof to produce a resinous polymer of ethylene under vapor phase polymerization conditions. One and one-hundredth mols magnesium ethylate and 0.40 mols tetrabutyl titanate was dissolved in 90 ml nonane by heating under nitrogen at 150° C. in a 2-liter 3-necked flask equipped with stirrer, thermocouple and condenser equipped with nitrogen inlet at the top. After the solids dissolved, the solution was cooled to 100° C. and 1 liter hexane was added. The hexane diluted composition was added to a 5-liter 3-necked flask equipped with stirrer, addition funnel and thermocouple. One and eight-tenths moles ethylaluminum dichloride, as a 50% by weight solution in hexane was added slowly from the addition funnel to the 5-liter flask over a three hour period under ambient conditions. The catalyst mixture was allowed to stand over night and an additional 3.2 moles ethylaluminum dichloride, as a 50% by weight solution in hexane, was added from the addition funnel over a 2-hour period under ambient conditions. Excess supernatant (about 1.68 liters) was decanted off and replaced with 1 liter of hexane. The catalyst was inactivated by adding a solution of 300 ml hexane and 117 ml ethanol to the stirred catalyst suspension over a 1¼ hour period while maintaining the composition at about 33° C. with a water bath. After the catalyst composition was permitted to stand for one day, 1.46 liters of excess supernatant was decanted off and replaced with 1 liter of hexane thereby forming a temporarily inactive high yield titanium catalyst component having a 1:1 mol ratio of ethanol to aluminum.

Twenty grams of ethanol inactivated titanium catalyst component, prepared in the preceding paragraph, was deposited in the catalyst vessel 1 of a pilot plant vapor phase polymerization reactor described in the drawing, which was run at the rate of about 27 to 30 pounds polymer per hour. Eighteen-one thousandth of a gram of the ethanol inactivated titanium catalyst component was metered out incrementally each 2.7 minutes (0.40 grams per hour) from a Seiscor mud feeder 3 and combined in addition port 5 with virgin isobutane quench liquid flowing through the system at a constant rate of 1 gallon per hour. The partially diluted titanium catalyst component was passed from mixing vessel 7 without change of flow rate and combined in the line connecting mixing vessel 7 and reactor 9 with recycled isobutane quench liquor emanating from liquid pump 31 at a constant rate of 6 gallons per hour. The isobutane diluted inactive high yield titanium catalyst component was sprayed onto the resinous polymer of ethylene polymer bed, which took up about 60% of the volume of the reactor at start up and during vapor phase polymerization, while simultaneously an additional one gallon per hour of virgin isobutane was sprayed from a donut shaped addition port (not shown in the drawing) surrounding the opening through which the isobutane diluted titanium catalyst component entered the vapor phase reactor 9. (This donut shaped addition port was used to prevent build up of polymer at the entry point of the titanium catalyst component.) The vapor phase reactor 9 was 2 feet in diameter (22.9 inches inside diameter) by 46 inches long, 36 inches from entrance plate, a 17.7 inches high weir (not shown in the drawing) was located in front of the take off 23. The reactor 9 was equipped with 3 inches wide impellers or paddles 19 along the shaft connected to motor 21. There were sets of 3 inches wide paddles emanating at 180° from each side of the shaft along the entire shaft to avoid dead spots. Every other set of paddles was at 90° from the preceding set and all the paddles came within about ¼ to ½ inch of the reactor shell. Simultaneously with the addition of inactive titanium catalyst component, 1.6 grams per hour triethyl aluminum (active weight) as a 15% by weight solution in hexane was sprayed onto the polymer bed from addition ports 11 thereby activating the high yield titanium catalyst component and 35 pounds per hour of ethylene and 0.35 pounds per hour butene-1 were added from addition port 13. Sufficient make up hydrogen was added from port 15 to maintain constant 30.7 mole percent hydrogen concentration in the gases entering the reactor at ports 17. The motor 21 was run at 20 rpm while the reactor was maintained at about 200° F. and 400 psig and resinous polymer of ethylene collected, as it flowed under the weir, referred to above, at the rate of 27 to 30 pounds per hour in take off 23. Typically, substantially all of the polymer was over 75 micron diameter and about 50% over 425 micron. Vaporized isobutane, hydrogen, ethylene, resinous polymer of ethylene fines and aluminum alkyl left the reactor 9 and entered scrubber 25 where a substantial portion of polymer fines and aluminum alkyl was collected. The condensate from the bottom of scrubber 25 were collected in a system not shown. Scrubber off gas containing ethylene, hydrogen, isobutane and small quantities of aluminum alkyl went to the heat exchanger 27 where the remainder of the aluminum alkyl was removed and liquid isobutane containing olefin was collected in condensate receiver 29. The gases collected in heat exchanger 27, primarily ethylene, hydrogen and isobutane, exited to the recycle compressor 33 and were recycled to the reactor. The collected isobutane quench liquor passed from liquid pump 31 to the catalyst addition line connecting mixing vessel 7 and reactor 9.

The vapor phase unit was operated in this manner for 24 hours without any line plugging before it was shut down. When this process was attempted using an untreated active catalyst, the catalyst addition line plugged after 5 minutes operation.

Essentially the same results can be obtained without the butene-1.

EXAMPLE II

This example illustrates the preparation of a temporarily inactive titanium catalyst component with 0.62 mols of ethanol per mol of aluminum. The process described in Example I for the production of the catalyst was repeated using 178 grams magnesium ethylate, 212 ml tetrabutyl titanate and about 110 ml nonane in the first step; the solution was diluted with sufficient hexane to form a 1.03 molar magnesium composition; 780 ml of the 1.03 molar magnesium supported catalyst composition and 420 ml hexane were placed in a 5-liter flask; 855 ml of ethylaluminum dichloride (50% by weight in hexane) were added over a 2½ hour period; an additional liter of hexane was added; the mixture was allowed to stand until the solids had settled; 1.97 liters of excess supernatant were removed; one liter of hexane was added; followed by a solution of 500 ml hexane and 37 ml ethanol. The resultant titanium catalyst component had been inactivated with 0.62 mols ethanol per mol of aluminum. Forty grams of Syloid 244, Grade 68 was added to a 40 gram portion of the ethanol inactivated titanium catalyst component.

The vapor polymerization was carried out in essentially the manner described in Example I by adding 20 grams of Syloid extended catalyst to the catalyst vessel 1 and running the motor 21 at 15 rpm. The polymerization lines plugged after 3½ hours of operation.

When the vapor phase polymerization was repeated except that the ratio of virgin isobutane to recycled isobutane was changed from 6:1 to 4:3 by adding 3 gallons per hour of virgin isobutane to the line connecting addition port 5 and mixing vessel 7 and by reducing the flow rate of recycled isobutane entering the line connecting mixing vessel 7 and vapor phase reactor 9 to 3 gallons per hour, the polymerization was continued at the rate of 27 to 30 pounds per hour and there was no plugging of the reactor after 27 hours of operation.

EXAMPLE III

This example illustrates the use of 95 percent ethanol and 5 percent methanol to form the temporarily inactive titanium catalyst component. The catalyst was prepared in essentially the manner described in Example I except that 0.93 mols of ethanol and 0.07 mols of methanol per mol of aluminum were used to inactivate the titanium catalyst component.

The catalyst composition was added to the catalyst vessel and vapor phase polymerization was carried out in the manner described in Example I at a rate of 27 to 30 pounds of resinous polymer of ethylene per hour. The reaction was shut down after 2½ hours due to a partial plugging in the line connecting mixing vessel 7 with reactor 9, which was attributed to possible contamination of the addition line since a new line had been installed just prior to this run. The partial plug was blown clear and the polymerization was continued for an additional 33 hours without any plugging.

EXAMPLE IV

This example illustrates the production of a temporarily inactive titanium catalyst component using 1 mol of methanol per mol of aluminum. The catalyst was prepared in the same manner as the catalyst described in Example I except that 1 mol of methanol was used to deactivate the catalyst per mol of aluminum.

Vapor phase polymerization was carried out at a rate of 27 to 30 pounds of resinous polymer of ethylene per hour in the manner described in Example I. The process was terminated after 85 minutes since it was noted that there were some white precipitates in the catalyst being fed to the mixing vessel.

EXAMPLE V

This example illustrates the temporary inactivation of titanium catalyst component using oxygen. The supported titanium catalyst component was prepared in essentially the manner described in Example I except that 0.25 mols of oxygen per mol of aluminum in the catalyst was passed into the catalyst composition. When this temporarily inactive titanium catalyst component was used, in the manner described in the vapor phase polymerization in Example I, the line plugged after 10 minutes apparently due to insufficient deactivation of the catalyst for the volume of recycled quench liquid.

When the ratio of fresh virgin isobutane to recycled isobutane was increased to 4:3 as described in Example II, the vapor phase polymerization was carried out at a rate of 27 to 30 pounds resinous polymer ethylene per hour for 8½ hours without any plugging of the line. Accordingly, oxygen can be used as a suitable inactivator provided that sufficient oxygen is used to inactivate the titanium catalyst component or the concentration of recycled liquid is reduced.

EXAMPLE VI

This example illustrates the temporary inactivation of titanium catalyst component with a 1 mol of isopropanol per mol of aluminum. The catalyst was prepared in the same manner described in Example I except that 1 mol of isopropanol was used to inactivate the catalyst per mol of aluminum. When vapor phase polymerization was carried out utilizing this catalyst in the manner described in Example I, 27 to 30 pounds resinous polymer of ethylene per hour was formed and there was no plugging after 2 hours and 25 minutes of operation. Polymerization was terminated since other studies were scheduled and since the isopropanol activated titanium catalyst component provided a polymer composition having a relatively narrow molecular weight distribution.

EXAMPLE VII

This example illustrates deactivation of titanium catalyst component using HCl. The catalyst was prepared in essentially the manner described in Example I and deactivated with sufficient gaseous hydrogen chloride to provide 0.52 mols of hydrogen chloride per mol of aluminum. When this catalyst was employed for the polymerization of polyethylene using the technique described in Example II with a 4:3 ratio of virgin isobutane to recycled isobutane, and motor 21 at 15 rpm, the polymerization was carried out for 12 hours at a rate of 27 to 30 pounds polymer per hour without plugging. The polymerization was terminated due to catalyst feed problems and the line did contain some polymer but there was no blockage.

When this example was repeated using 0.125 mol HCl per mol aluminum and 0.25 mols HCl per mol of aluminum and without the flush from the donut shaped addition port, the lines plugged after 2 hours and 20 minutes and 2 hours and 25 minutes. However, when a catalyst was employed without any inactivation using the same 4:3 ratio the lines plugged after 5 minutes operation.

We claim:

1. The method of producing a resinous polymer of olefin by vapor phase polymerization of an olefin which comprises conveying inactive high yield titanium catalyst component to a vapor phase polymerization reactor with a liquid comprising recycled quench liquid, reactivating said inactive high yield titanium catalyst component inside the reactor with a metal alkyl reducing agent and polymerizing olefin under gas phase polymerization conditions with reactivated high yield catalyst to form a resinous polymer of an olefin having a low level of catalyst residues.

2. The process of claim 1 wherein said high yield titanium catalyst component comprises a magnesium supported catalyst and said recycled quench liquid comprises an alkane.

3. The process of claim 2 wherein said olefin comprises ethylene.

4. The process of claim 3 wherein said metal alkyl reducing agent comprises a trialkyl aluminum.

5. The process of claim 4 wherein said high yield titanium catalyst component conveyed to the polymerization reactor has been deactivated to a temporary inactive state with an alcohol.

6. The process of claim 5 wherein said alcohol comprises ethanol.

7. The process of claim 5 wherein said alcohol comprises methanol.

8. The process of claim 4 wherein said high yield titanium catalyst component conveyed to the polymerization reactor has been deactivated to a temporary inactive state with hydrogen chloride.

9. The process of claim 4 wherein said high yield titanium catalyst component conveyed to the polymerization reactor has been deactivated to a temporary inactive state with oxygen.

10. The process of claim 1 wherein said olefin comprises propylene.

11. The method of producing a resinous polymer of an olefin by vapor phase polymerization of an olefin which comprises conveying inactive high yield titanium catalyst component to a vapor phase polymerization reactor with a liquid comprising from 25 to 95 parts by weight recycled quench liquid, and from 75 to 5 parts by weight virgin quench liquid reactivating said inactive high yield titanium catalyst component inside the reactor with a metal alkyl reducing agent and polymerizing olefin under gas phase polymerization conditions with reactivated high yield catalyst to form polyolefin having a low level of catalyst residues.

12. The process of claim 11 wherein said high yield titanium catalyst is a magnesium supported catalyst capable in the active form of yielding at least 10,000 grams of polyolefin per gram of titanium catalyst component when used in conjunction with a metal alkyl reducing agent.

13. The process of claim 12, wherein said recycled quench liquid comprises an alkane.

14. The process of claim 13 wherein said olefin comprises ethylene and the liquid conveying the inactive titanium catalyst component to the reactor comprises from 50 to 90 parts by weight recycled quench liquid and 50 to 10 parts by weight virgin quench liquid.

15. The process of claim 14 wherein said high yield titanium catalyst component conveyed to the polymerization reactor has been deactivated by from 50 to 150 mol percent of a deactivating agent, based on the alkyl groups and/or hydride groups bonded to metal present in the titanium catalyst component.

16. The process of claim 15 wherein said high yield titanium catalyst component has been deactivated to a temporary inactive state with an alcohol.

17. The process of claim 16 wherein said alcohol comprises ethanol.

18. The process of claim 16 wherein said alcohol comprises methanol.

19. The process of claim 15 wherein said high yield titanium catalyst component has been deactivated to a temporary inactive state with HCl.

20. The process of claim 15 wherein said high yield titanium catalyst component has been deactivated to a temporary inactive state with oxygen.

21. The process of claim 13 wherein said olefin comprises ethylene and butene-1.

22. The process of claim 11 wherein said olefin comprises propylene.

* * * * *